United States Patent
Lomas et al.

(10) Patent No.: US 8,857,848 B2
(45) Date of Patent: Oct. 14, 2014

(54) COLLAPSIBLE VEHICLE TRAILER

(76) Inventors: Peter Martin Lomas, Wirral (GB);
Claire Michelle Lomas, Wirral (GB)

( * ) Notice: Subject to any disclaimer, the term of this patent is extended or adjusted under 35 U.S.C. 154(b) by 0 days.

(21) Appl. No.: 13/574,373

(22) PCT Filed: Jan. 4, 2011

(86) PCT No.: PCT/GB2011/050001
§ 371 (c)(1),
(2), (4) Date: Jul. 20, 2012

(87) PCT Pub. No.: WO2011/089406
PCT Pub. Date: Jul. 28, 2011

(65) Prior Publication Data
US 2012/0292890 A1 Nov. 22, 2012

(30) Foreign Application Priority Data
Jan. 21, 2010 (GB) .................................. 1000906.6

(51) Int. Cl.
*B62D 63/06* (2006.01)
(52) U.S. Cl.
CPC .............. *B62D 63/061* (2013.01); *B62D 63/06* (2013.01); *B62D 63/064* (2013.01)
USPC ........... 280/656; 280/650; 280/651; 280/653; 280/654; 224/153
(58) Field of Classification Search
CPC combination set(s) only.
See application file for complete search history.

(56) References Cited

U.S. PATENT DOCUMENTS

| | | | | |
|---|---|---|---|---|
| 4,263,925 A | * | 4/1981 | Arganbright | 135/137 |
| 4,883,206 A | * | 11/1989 | Miller | 224/153 |
| 5,957,525 A | * | 9/1999 | Nelson | 296/165 |
| 6,948,632 B2 | * | 9/2005 | Kellogg et al. | 220/9.4 |
| 7,150,465 B2 | * | 12/2006 | Darling, III | 280/640 |

FOREIGN PATENT DOCUMENTS

| | | | |
|---|---|---|---|
| EP | 0 377 391 | | 7/1990 |
| FR | 2 615 834 | | 12/1988 |
| GB | 2 035 915 | | 6/1980 |
| GB | 1 593 646 | | 7/1981 |
| GB | 2 122 554 | | 1/1984 |
| GB | 2 359 281 | | 8/2001 |
| GB | 2359281 A | * | 8/2001 |
| GB | 2 459 465 | | 10/2009 |
| GB | 2459465 A | * | 10/2009 |

OTHER PUBLICATIONS

International Search Report for PCT/GB2011/050001, mailed Feb. 10, 2011.
http://web.archive.org/web.200802211827/compact camping concepts.com/Tent+Units.ht.; (Aug. 2, 2008), 3 pages.

* cited by examiner

*Primary Examiner* — J. Allen Shriver, II
*Assistant Examiner* — Hilary L Johns
(74) *Attorney, Agent, or Firm* — Nixon & Vanderhye P.C.

(57) ABSTRACT

A collapsible vehicle trailer comprises a detachable lightweight enclosure (1), consisting of flexible, collapsible walls (21) and floor (22). The enclosure has two or more support frame members (2) integral to the structure of the enclosure. The support frame members are integrated into the structure of the enclosure by virtue of horizontal loops (3) and vertical loops (4). The enclosure is detachably connected to the rigid frame of the vehicle trailer, by means of the integral support frame members and the front transverse frame member (5) and the rear transverse frame member (6). The enclosure becomes a self supporting, freestanding structure when detached from the trailer frame. The enclosure also acts as a storage bag for the constituent components of the collapsed trailer frame.

4 Claims, 9 Drawing Sheets

COLLAPSIBLE VEHICLE TRAILER

This application is the U.S. national phase of International Application No. PCT/GB2011/050001, filed 4 Jan. 2011, which designated the U.S. and claims priority to GB Application No. 1000906.6, filed 21 Jan. 2010, the entire contents of each of which are hereby incorporated by reference.

The present invention relates to vehicle trailers and in particular to collapsible vehicle trailers.

Vehicle trailers are well known devices used for transporting loads whilst being towed by a vehicle. However, a major problem with conventional vehicle trailers is that they tend to be bulky devices, and as such require a lot of storage space when not in use. In general, a vehicle trailer is only used intermittently for load carrying purposes, and will therefore spend the majority of its life in storage. It would therefore be preferable for such a vehicle trailer to be collapsible, so that it can be stored in a relatively small space when not in use.

Various forms of collapsible vehicle trailer have been known in the past. Examples of such collapsible trailers are disclosed, for example, in GB 2421933 A (RYE ET AL) Dec. 7, 2006 and GB 2359281 A (AVPROD LTD.) 22 Aug. 2001. Such examples are known to have a frame made of detachable sections, with the load carrying enclosure consisting of either rigid panels that fold down, or flexible walls that collapse.

In the present invention in a collapsible vehicle trailer and detachable enclosure combination, said enclosure comprises a container for carrying loads, has a plurality of flexible collapsible walls, a flexible collapsible floor and two or more support frame members, said enclosure being detachably connected to a rigid frame of the vehicle trailer and being a self supporting, freestanding structure when detached from the rigid frame of the vehicle trailer.

Once detached from the trailer frame, the enclosure, consisting of flexible walls and floor and support frame members, can be used as a storage bag. In this storage bag form, one or more of the frame members may be stored in the enclosure. In addition the vehicle trailer itself may comprise a plurality of detachably interconnected frame members, which when the trailer is collapsed fit in the detachable enclosure and may be carried therein. Thus all components of the collapsible trailer and the support frame members can be carried and stored in the enclosure, like a large hold-all bag.

In the embodiments described in preceding paragraphs, the enclosure can serve two main purposes, the first being carrying a load, the second being carrying and storing the collapsible trailer frame. In the present invention, when the enclosure is used as a storage bag containing the constituent components of the collapsible trailer, it can be made of a small enough size to take up minimal storage space, and will preferably fit into the boot of a conventional car. As a consequence there would be no need for such a vehicle trailer to be towed whilst un-laden. Instead it could be collapsed and transported in the boot of the towing vehicle.

In one embodiment of the invention the said support frame members themselves may provide the means for detachable connection of the enclosure to the rigid frame of the vehicle trailer.

Furthermore the flexible collapsible floor of the enclosure may have stiffening members spanning the length and/or width, of the enclosure, which may be removable.

Still further one or more of the flexible, collapsible walls of the enclosure may have stiffening members spanning the length or width, as appropriate, of the enclosure, which may be removable.

In such a collapsible vehicle trailer and detachable enclosure combination, the support frame members may have means for detachable connection to one or more transverse support members, forming a rigid frame to maintain the shape and function of the enclosure when detached from the vehicle trailer.

Additionally the enclosure may have two or more handles attached to or integrated within the support frame members.

Conveniently the flexible collapsible walls and/or flexible, collapsible floor comprise fabric or flexible polymer.

The support frame members can serve several purposes. The first of which is to give structural integrity to the flexible, collapsible walls and floor of the enclosure. This allows the enclosure to maintain its shape and strength when detached from the trailer frame, so that it can be a freestanding structure in its own right. The second is to provide a reliable mechanical means for detachably connecting the enclosure to the trailer frame. The third is to provide the means for carrying the detached enclosure, laden or un-laden, to or from the trailer frame, and provide sufficient mechanical strength.

To summarise, the advantages of the present invention over those collapsible vehicle trailers already known, result from the fact that the flexible, collapsible walls and floor of the enclosure contain support frame members which are integral to the structure of the enclosure. These support frame members give a certain amount of rigidity to the walls and floor of the enclosure, whilst still allowing the enclosure enough flexibility to collapse in such a way as to act as the storage bag for the collapsed trailer frame. The support frame members also allow the enclosure to maintain its shape and structure as a freestanding entity when detached from the trailer frame itself. Furthermore, the support frame members give a means for carrying the detached enclosure, either with it laden or un-laden with a load, or in its embodiment as the storage bag for the collapsed trailer. Additionally, the support frame members of the present invention allow the means for attachment of the enclosure to the trailer frame, resulting in a rigid mechanical coupling between the relevant components.

In the further embodiments of the invention additional support members may be utilised for additional structural and strength benefits. Additional handle features aid carrying the enclosure, both in its open, laden state, and when it is utilised as the carrying and storage bag for the collapsed trailer.

An embodiment of the present invention will now be described by referring to the accompanying drawings in which.

Figure 1:
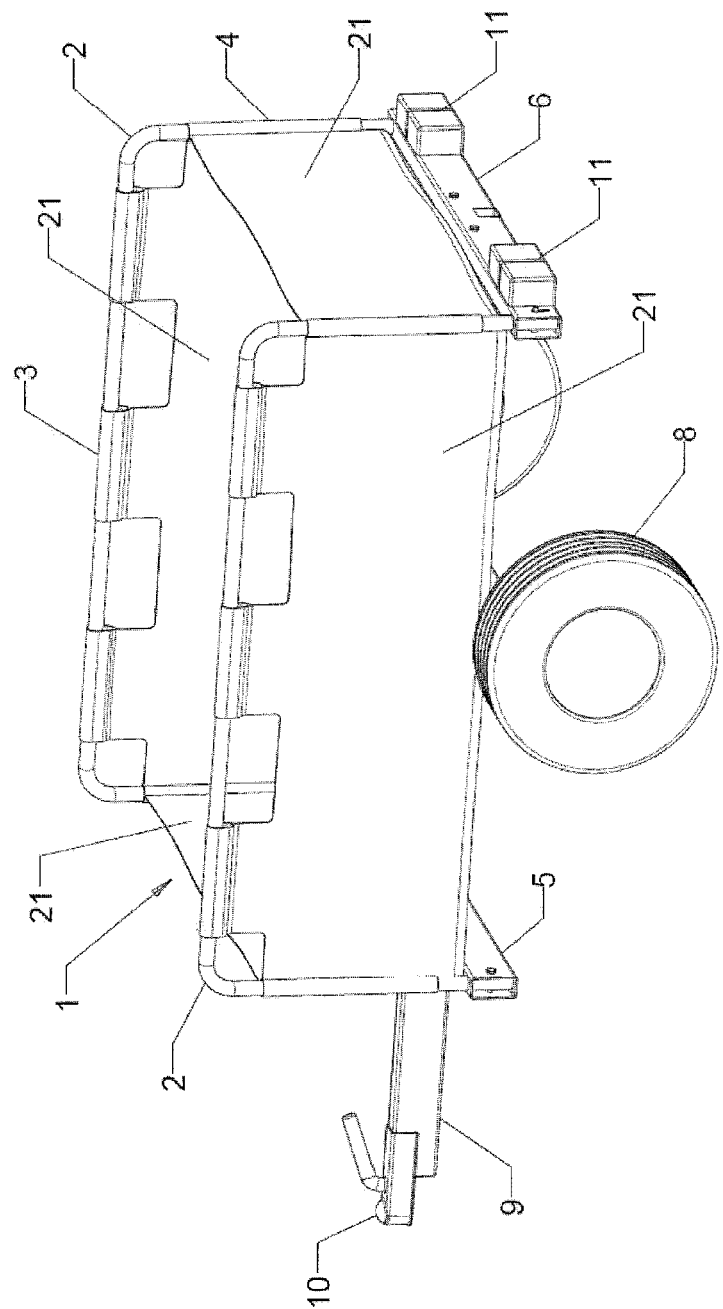
FIG. 1 is a perspective view of the assembled vehicle trailer in accordance with the present invention.
Figure 2:
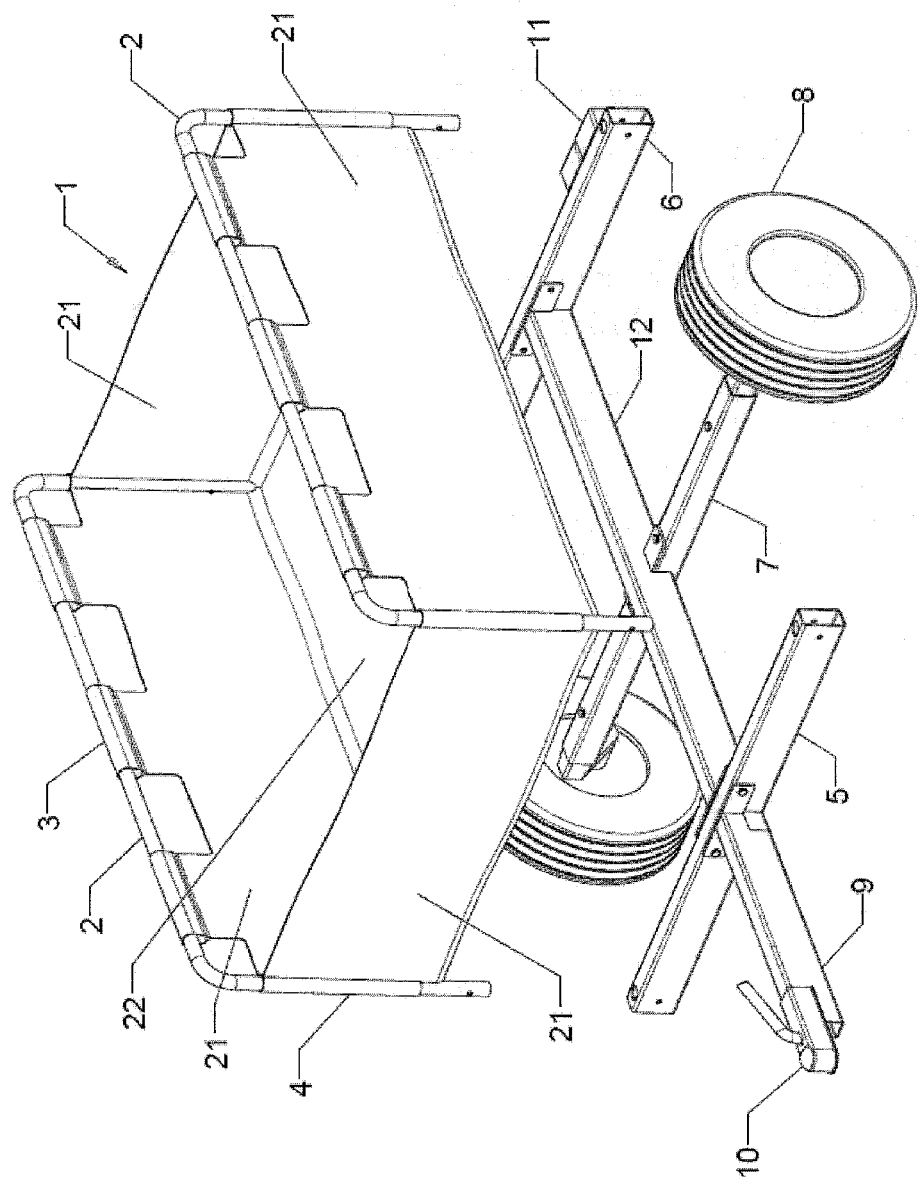
FIG. 2 is a perspective view of the vehicle trailer with the detachable lightweight enclosure lifted off.
Figure 3:
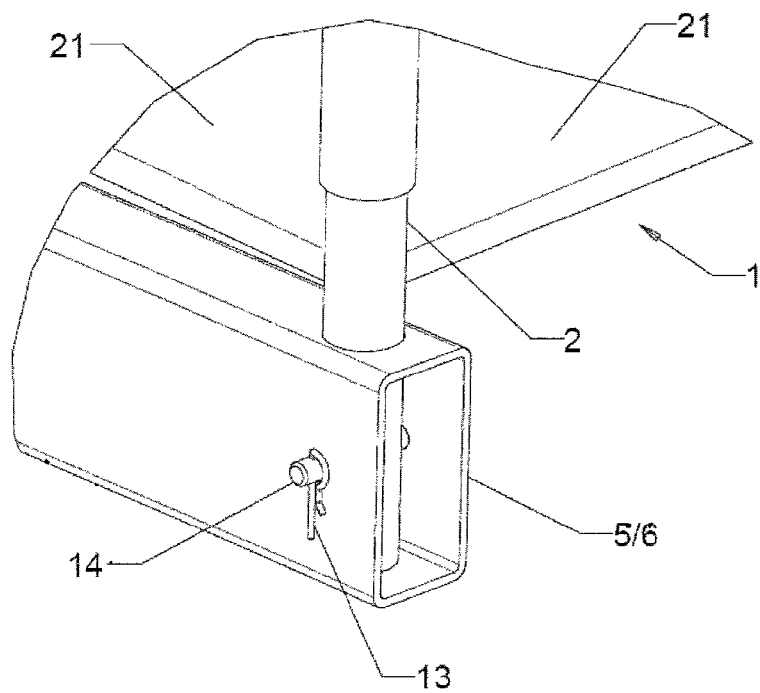
FIG. 3 is a detailed view of one embodiment of the means for detachably connecting the enclosure to the trailer frame, in connected state.
Figure 4:
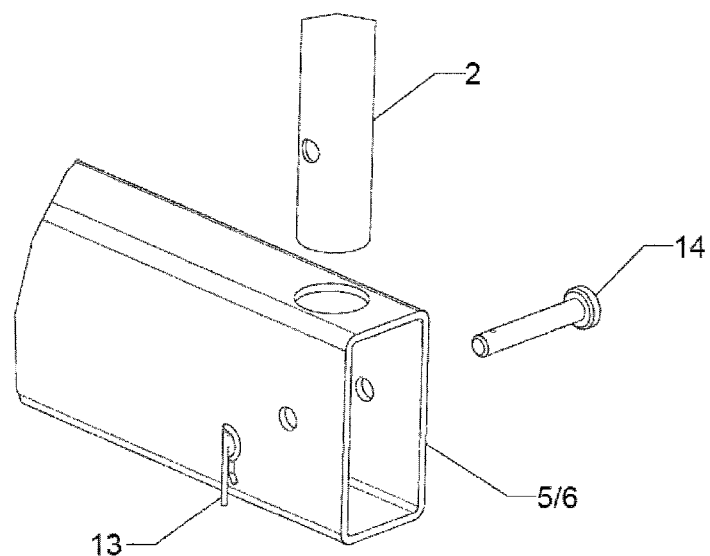
FIG. 4 is a detailed view of one embodiment of the means for detachably connecting the enclosure to the trailer frame, in disconnected state.
Figure 5:
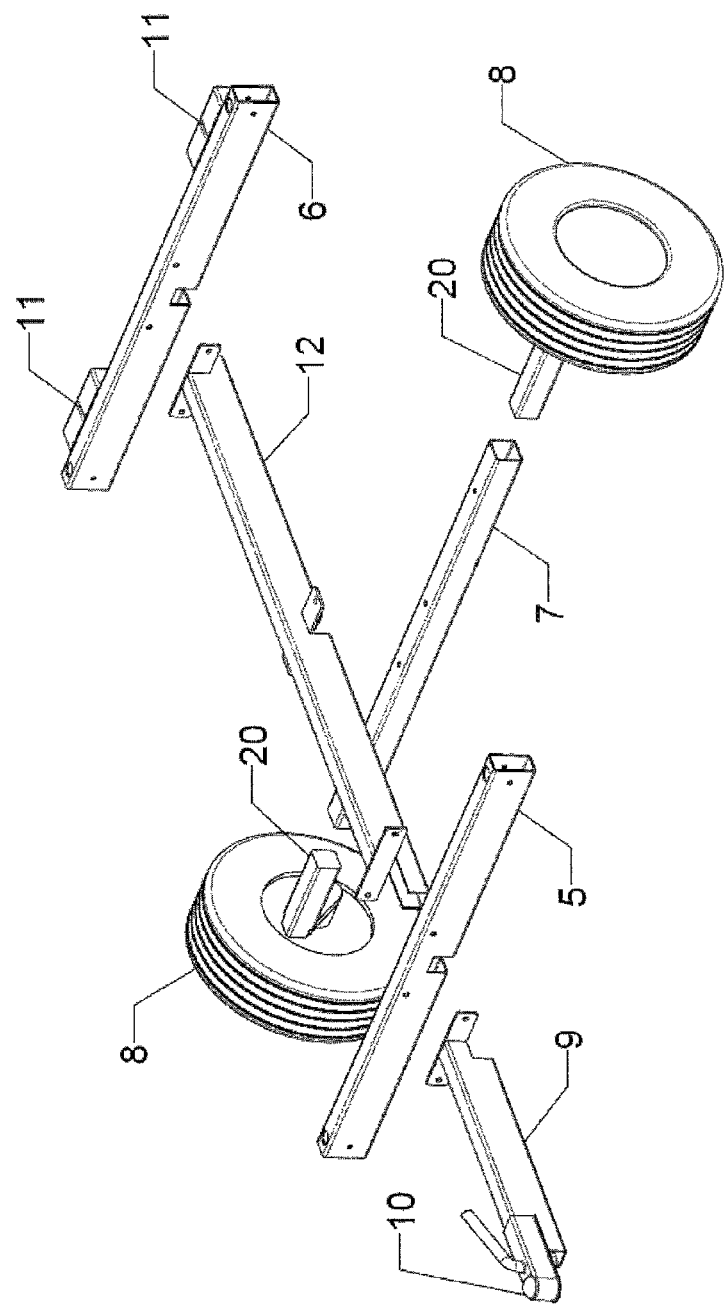
FIG. 5 is an exploded view of the collapsible trailer frame and constituent components.

By reference to the figures, an embodiment of the present invention comprises a lightweight detachable enclosure (1) consisting of flexible, collapsible walls (21) and floor (22), which may be made of woven fabric such as canvas, or flexible polymer such as woven polypropylene, or PVC tarpaulin. The flexible walls (21) and floor (22) may be stitched or welded together to form a box-like shape, similar to conventional box trailers. A plurality of horizontal loops (3) and vertical loops (4) are incorporated into the structure of the walls (21) of the enclosure in order to accommodate the support frame members (2) integral to the structure of the enclosure. Said support frame members may be made from metal tubing, such as aluminium or steel, and fabricated into the shape illustrated in order to support the box shape of the enclosure. The support frame members are integrated into the structure when the enclosure is manufactured, preferably by the aforementioned loops (3,4) being stitched around the support frame members, thus ensuring the enclosure and support frame members are a permanent assembly.

The support frame members are detachably connected to the trailer frame, in particular to a front transverse frame member (5) and to a rear transverse frame member (6). The support frame members can be retained in place, for instance using a locking pin (14) and R-type clip (13).

The collapsible trailer frame consists of inter-connectable frame members, for instance made from aluminium or steel box section extrusions. The frame comprises a main central member (12), to which can be attached a front transverse frame member (5) and a rear transverse frame member (6). The front transverse frame member (5) is connected to the trailer frame between the main central member (12) and a front central member (9), which in turn comprises the conventional locking device (10) used for connecting the trailer to the tow-ball of the towing vehicle.

The rear transverse frame member (6) may also incorporate the brake and signal lights (11).

The trailer axle (7) is also transversely attached to the main central member (12), mid-way between front and rear transverse frame members (5,6). A standard trailer wheel (8) is attached to each end of the trailer axle (7) via a trailer suspension unit (20).

Figure 6:
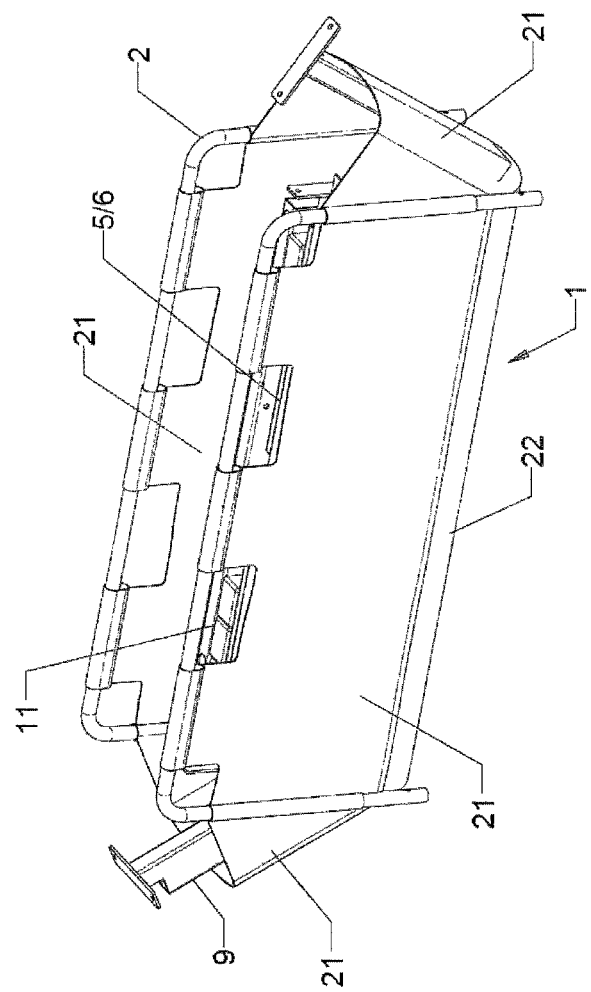
FIG. 6 is a perspective view of the detachable lightweight enclosure acting as a storage bag and containing the constituent components of the collapsible trailer frame.
Figure 7:
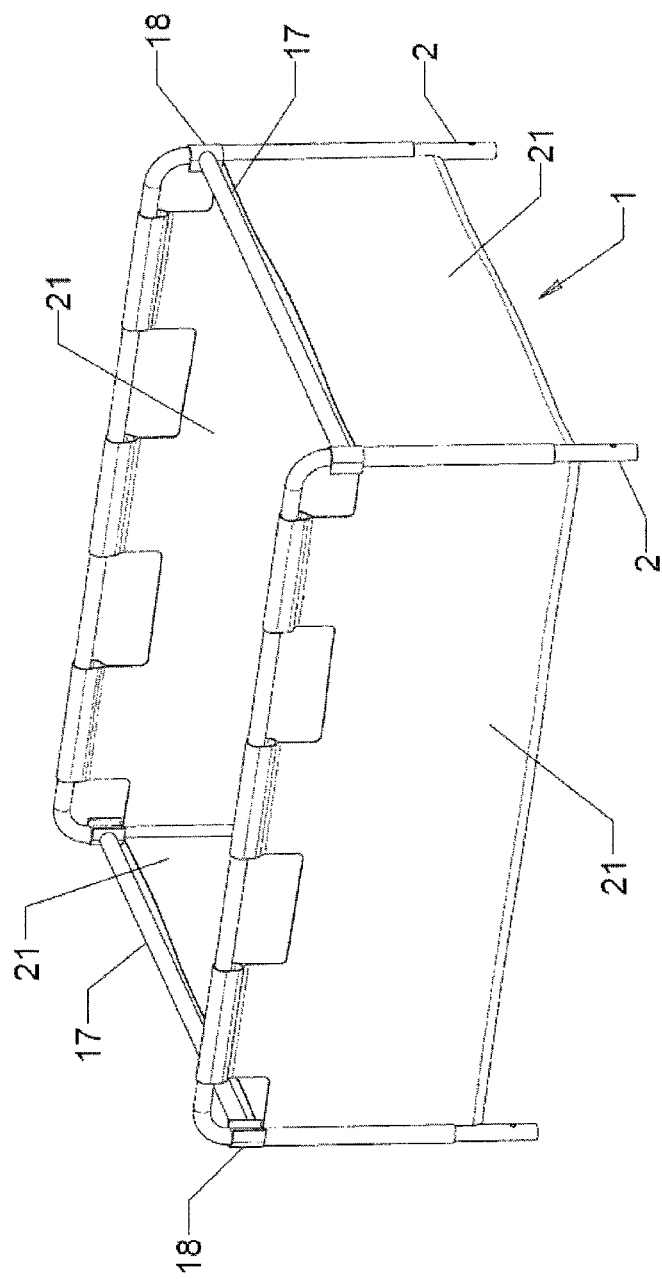
FIG. 7 is a perspective view of the detachable lightweight enclosure in a freestanding state complete with transverse support members.
Figure 8:
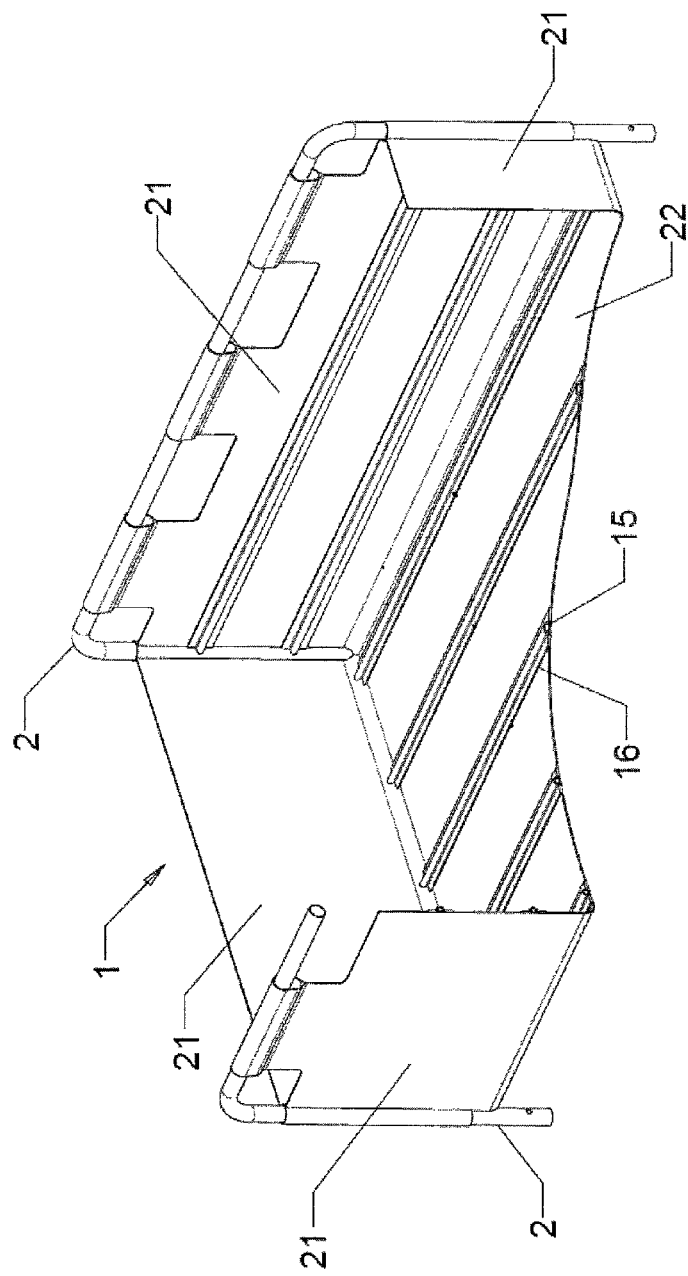
FIG. 8 is a cross-sectional view of the detachable lightweight enclosure depicting integral stiffening members.
Figure 9:
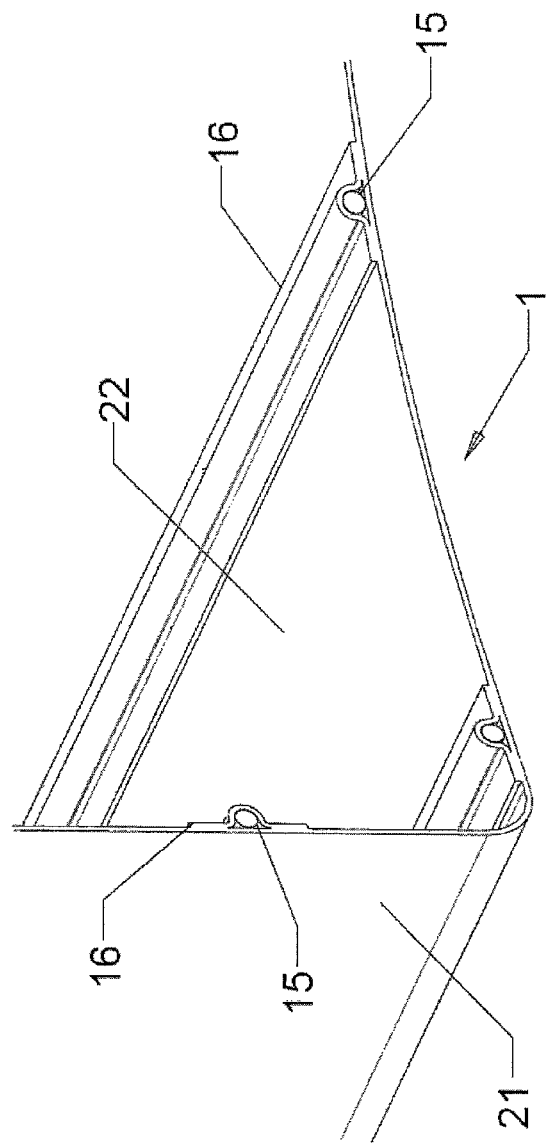
FIG. 9 is a detailed view depicting the integral stiffening members.
Figure 10:
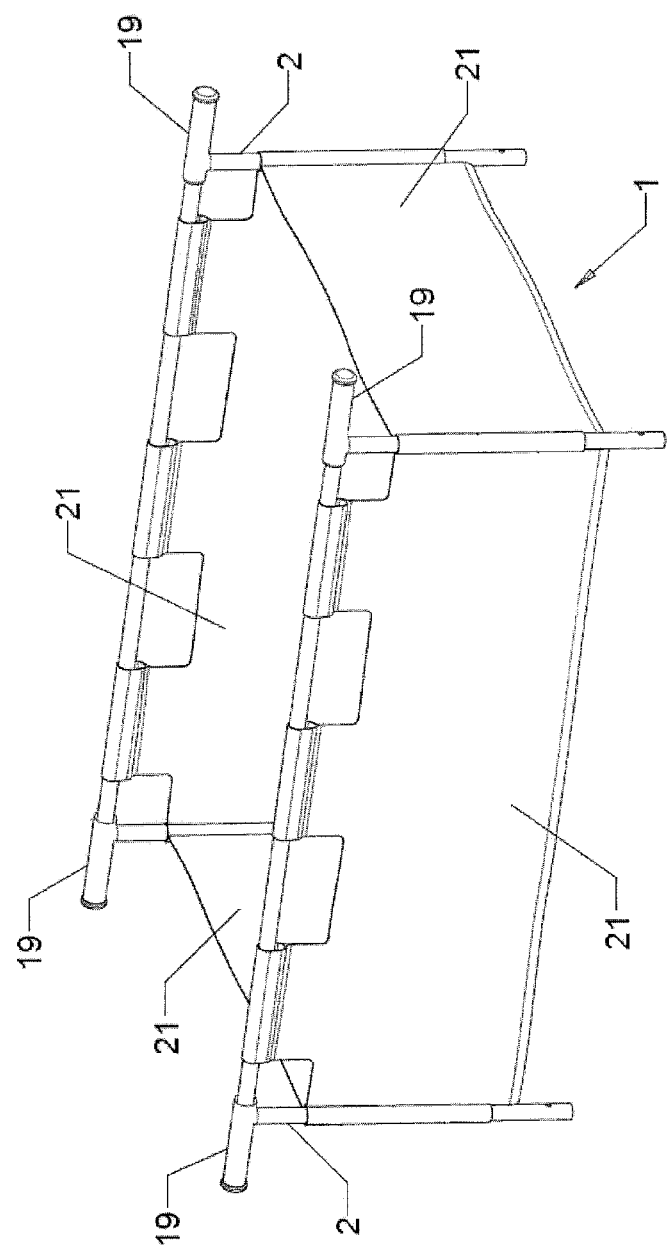
FIG. 10 is a perspective view of the detachable lightweight enclosure depicting handle features.

As illustrated in FIG. 6, the lightweight detachable enclosure (1) can be used as a storage bag for the constituent parts of the collapsible trailer frame. The support frame members (2) integral to the structure of the enclosure help give the storage bag rigidity, as well as being used to carry the bag.

When detached from the trailer frame, the lightweight detachable enclosure may require additional transverse support members (17) in order to maintain the shape of the enclosure when freestanding. These transverse support members (17) may also be utilised when the enclosure is attached to the trailer frame. The transverse support members can be detachably connected to the integral support frame members by means of connecting hooks (18), so designed in order to maintain rigidity of the whole structure.

Further integral stiffening members (15) may be added to the walls (21) or floor (22) of the enclosure in order to give further mechanical strength to the assembly. These stiffening members (15) may typically be metal or composite rods, or other extruded profiles. They can be integrated into the enclosure by stitching a housing (16) made of the same material as the walls (21) or floor (22). The arrangement may be such that the stiffening members (15) can be added to, or removed from, the housing (16) dependent on the stiffness required from the enclosure.

A further embodiment of the present invention may include handle features (19), integral to, or attached to the support frame members (2). Such handle features (19) are to aid carrying of the enclosure, laden or unladen with a load, or when being used as the storage bag.

The invention claimed is:

1. A collapsible vehicle trailer comprising: a transverse axle on which wheels are mounted at each end; a longitudinal central member demountably supported on the axle; a plurality of transverse members, each of said transverse members demountably supported directly on the longitudinal central member and each of said transverse members having ends and location points at said ends; and an enclosure mounted on the transverse members, said enclosure comprising: a plurality of flexible collapsible walls, a flexible collapsible floor, and at least two support frame members, each support frame member having a horizontal portion extending between two vertical portions, wherein the flexible collapsible walls have a plurality of horizontal loops and a plurality vertical of vertical loops, the horizontal loops configured to engage around said vertical portions of each support frame and the vertical loops configured to engage around said horizontal portions of each support frame, said enclosure detachably connected to the transverse members by the engagement of ends of said support frame vertical portions into said location points.

2. A collapsible vehicle trailer according to claim 1, wherein the support frames may be disengaged from the location points, with said enclosure forming a storage container for at least one of said transverse members, said axle, and said longitudinal member, wherein the support frames support the side walls of the storage container.

3. A collapsible vehicle trailer according to claim 1, wherein the flexible collapsible floor of the enclosure has removable stiffening members within the floor spanning at least one of the length and width of the enclosure.

4. A collapsible vehicle trailer according to claim 1, wherein at least one of the flexible collapsible walls of the enclosure additionally has removable stiffening members within the walls spanning at least one of the length and width of the enclosure.

* * * * *